United States Patent [19]

Wallis

[11] 4,145,725

[45] Mar. 20, 1979

[54] ELECTROMAGNETIC ACTUATOR

[75] Inventor: Christopher N. Wallis, Hampshire, England

[73] Assignee: International Business Machines Corporation, Armonk, N.Y.

[21] Appl. No.: 841,095

[22] Filed: Oct. 11, 1977

[30] Foreign Application Priority Data

Dec. 20, 1976 [GB] United Kingdom ............... 53033/76

[51] Int. Cl.² ............................................. G11B 17/00
[52] U.S. Cl. .................................. 360/106; 335/223; 310/36
[58] Field of Search ...................... 360/106, 97, 98–99; 335/222–226; 310/27, 36

[56] References Cited

U.S. PATENT DOCUMENTS 3,849,800   11/1974   Cuzner et al. ......................... 360/97

FOREIGN PATENT DOCUMENTS 841412   9/1976   Belgium .................................... 360/106

OTHER PUBLICATIONS

I.B.M./T.D.B. vol. 16, No. 10, Mar. 1974, by D. Cuzner et al., "Recording and/or Reproducing Head Ass'y.", p. 3385

Primary Examiner—John H. Wolff
Attorney, Agent, or Firm—Keith T. Bleuer

[57] ABSTRACT

An actuator comprising a transformer having a fixed primary winding on a magnetic core and a pivotally movable coil linked with the magnetic core and forming a secondary winding of the transformer. A permanent magnet generates a static magnetic field in which the coil is disposed. A transducer arm capable of pivotal movement is attached to the coil. When a current pulse is applied to the primary winding, a current is induced in the coil which reacts with the static magnetic field to cause pivotal movement of the coil and attached arm.

13 Claims, 10 Drawing Figures

ELECTROMAGNETIC ACTUATOR

BACKGROUND OF THE INVENTION

This invention relates to an electromagnetic actuator which has particular application for driving transducer arms in a magnetic disc file.

U.S. Pat. No. 3,849,800, issued Nov. 19, 1974, entitled "Magnetic Disc Apparatus" describes an electromagnetic actuator driving an angularly movable arm, carrying transducers for reading and writing tracks on the disc. The actuator consists of a hollow coil carried by the arm capable of moving along an arcuate path and a stator. The stator is an "E" shaped permanent magnet providing magnetic flux gaps within which the coil moves. Electrical connections are made to the coil to enable a current to be applied to the coil. When a current is passed through the coil, the coil experiences a force causing it to move and rotate the arm.

As the coil is multiturn, it must be wound on a coil former. The practical limit to the speed of operation of this prior art actuator is determined by the distortion of the coil former due to excessive heat generated in the coil by high currents through the coil.

SUMMARY OF THE INVENTION

According to the invention an electromagnetic actuator comprises a transformer having a fixed primary winding magnetically coupled by a magnetic core to a secondary winding formed by a pivotally or angularly movable coil, means to generate a static magnetic field coupled to the coil and at least one actuator arm attached to the coil capable of pivotal or angular movement whereby, when a current pulse is applied to the primary winding, a current is induced in the coil which reacts with the static magnetic field causing angular movement of the coil and attached arm.

According to another aspect of the invention a magnetic disc actuator comprises a main electromagnetic actuator as in the preceding paragraph and auxiliary means to provide a steady torque during track following.

DESCRIPTION OF THE PREFERRED EMBODIMENTS

In this specification, wherever possible the same numeral is used to denote the same part in the various diagrams.

Figure 1:
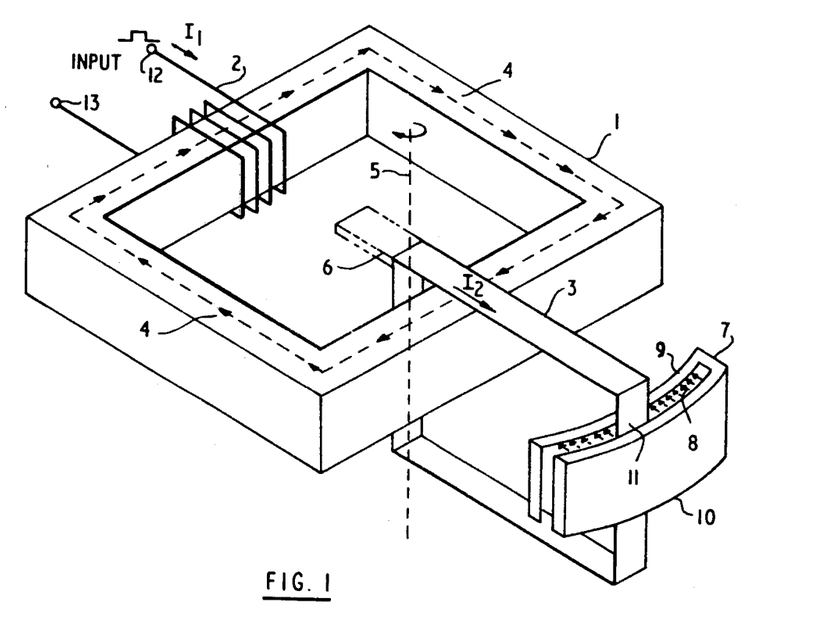
FIG. 1 is a schematic diagram showing an electromagnetic actuator illustrating the present invention.

Referring now to FIG. 1 which is in schematic form, a transformer core 1 of soft magnetic material is shown passing through a primary winding 2 and an armature or secondary winding or coil 3. Primary winding 2 is a multiturn winding, whereas in the embodiments described later secondary winding 3 has a single turn to provide a robust formerless construction. In other applications however secondary winding 3 may consist of more than one turn, according to design requirements. The assembly of magnetic core 1 and windings 2, 3 behaves as a conventional transformer and may be analysed and designed as is well known in the transformer art. A current in primary winding 2 generates an induction magnetic field 4 which is coupled to secondary winding 3 and induces a current in secondary winding 3 by transformer action.

Secondary winding or armature 3 is pivotably mounted to move angularly about axis of rotation 5. An actuator arm 6 is rigidly attached to secondary winding or armature 3 and will move angularly with armature 3. Permanent magnet 7 produces a radial static magnetic field 8 coupled to secondary winding 3. Permanent magnet 7 is of general U-shape with arcuate legs 9, 10 whose vertical surfaces are centered on axis of rotation 5 providing an arcuate pole-gap. One side 11 of secondary winding 3 lies between arcuate legs 9 and 10 and thus secondary winding 3 is coupled to radial static magnetic field 8.

When a current pulse $I_1$ is applied to primary winding 2, a changing magnetic flux 4 is generated in magnetic core 1 which is coupled to secondary winding 3 and induces a current $I_2$ in it. Interaction of induced current $I_2$ with static magnetic field 8 generates a force to cause angular movement of secondary winding or armature 3 and thus move actuator arm 6 angularly about axis 5.

Primary winding 2, magnetic core 1 and secondary winding or armature 3 together constitute a transformer and it is valid to regard the actuator as a conventional voice coil motor as described in the aforementioned patent coupled to its driver by a transformer. The secondary winding of the transformer is part of the voice coil, and moves with it, but this has no effect on the transformer action.

Providing the transformer is idealized, and does not saturate, the actuator viewed electrically through the primary terminals 12, 13, is indistinguishable from a conventional voice coil motor having an n turn coil in a similar magnet where n is the number of turns on the primary. The only fundamental difference is the presence of the primary inductance $L_p$ shown in FIG. 2 shunted across the input terminal. Since the inductance can be made high, it need have no practical effect upon the actuator dynamics or the driver.

Figure 2:
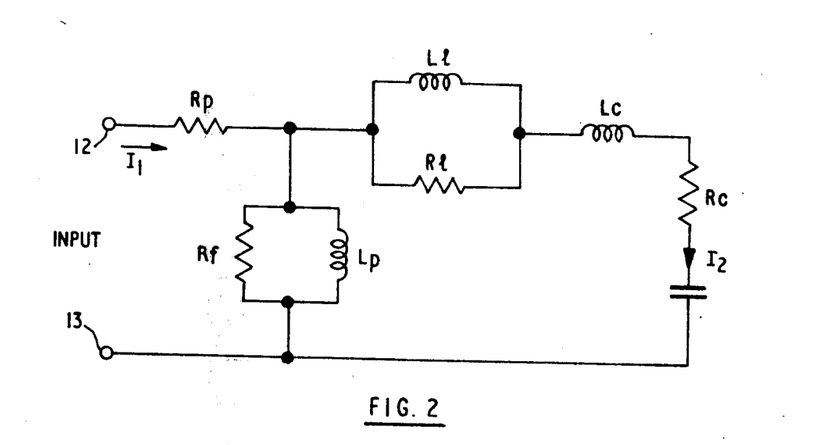
FIG. 2 is an equivalent circuit of the actuator shown in FIG. 1.

The equivalent circuit shown in FIG. 2 has been found to correspond well with actuator performance. It may be noted that not all the components will be significant in every embodiment. In the equivalent circuit:

$R_p$ is the DC resistance of primary winding 2, $L_p$ is the inductance seen through the primary terminal 12, 13 caused by magnetic flux 4 in magnetic core 1, $R_f$ represents the 'iron loss' in magnetic core 1, $R_f$ and $L_p$ together consume the 'magnetizing current' for magnetic core 1 which has to be supplied to primary winding 2, but does not cause any corresponding current in secondary winding 3. This current is normally small.

$L_l$ is an inductance which is caused by leakage flux linking the primary winding 2 but not the secondary winding 3, and which passes through lossy parts of the structure.

$R_l$ is a resistance representing the losses associated with leakage inductance $L_l$.

Both $L_l$ and $R_l$ may be small by proper design.

$L_c$ is the leakage inductance as seen through the input terminals 12, 13 due to the magnetic flux linking the primary winding 2 but not the secondary winding or armature 3, and passing through low loss paths such as air and magnetic core material.

C is an equivalent capacitor as seen through input terminal 12, 13 of the back EMF caused by angular motion of the secondary winding or armature 3 and has the value of:

$$C = j/Kt^2$$

where j is the inertia of secondary winding or armature 3 and Kt is the torque constant as defined as the torque produced by a secondary current of 1 ampere.

Figure 3:
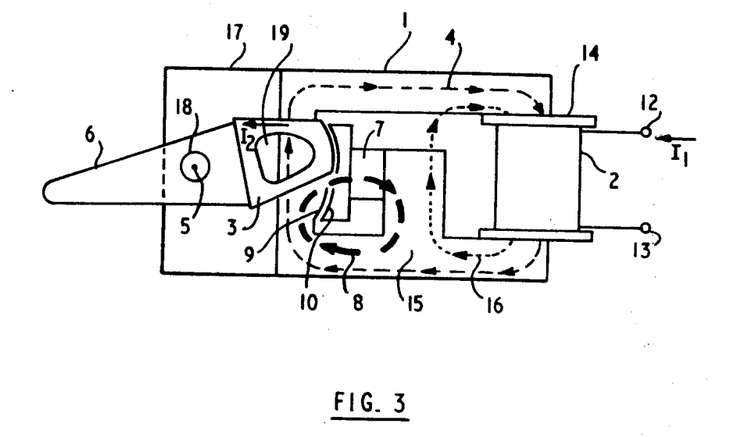
FIG. 3 is a plan view of an electromagnetic actuator embodying the present invention.

FIG. 3 shows a first practical embodiment of the invention in plan view, using wherever possible the same reference numerals as in FIG. 1. Primary winding 2 is wound on former 14 around magnetic core 1 formed of transformer laminations and provides a magnetic flux 4. Permanent magnet 7 provides a static magnetic field 8 across the arcuate gap between legs 9 and 10. A return path 15 carries the static magnetic field 8 and the leakage flux 16 of the primary winding.

A non-magnetic non-conductive structure 17 carries a bearing 18 about which arm 6 and armature 3 may pivot about axis of rotation 5. Armature 3 is apertured at 19 to reduce inertia and is cast in copper or aluminium to provide a low resistance secondary winding and may be integral with arm (or arms) 6. Armature 3 is of similar configuration to the armature shown in FIG. 5. When used as an actuator for a magnetic disk file, each arm 6 will carry at least one read/write head.

Operation of the actuator shown in FIG. 3 is similar to the actuator shown in FIG. 1 and will not be described in detail again — application of a current pulse $I_2$ to primary winding 2 causes pivotal or angular movement of armature 3 and arm 6. Experimental work showed that speed of operation of this actuator is approximately twice that of the aforementioned prior art actuator.

It may be noted that in FIG. 3, the primary magnetic flux 4 and static magnetic flux 8 have a portion of their paths in common. In the second embodiment of the invention shown in FIG. 4 these flux paths are separated.

Figure 4:
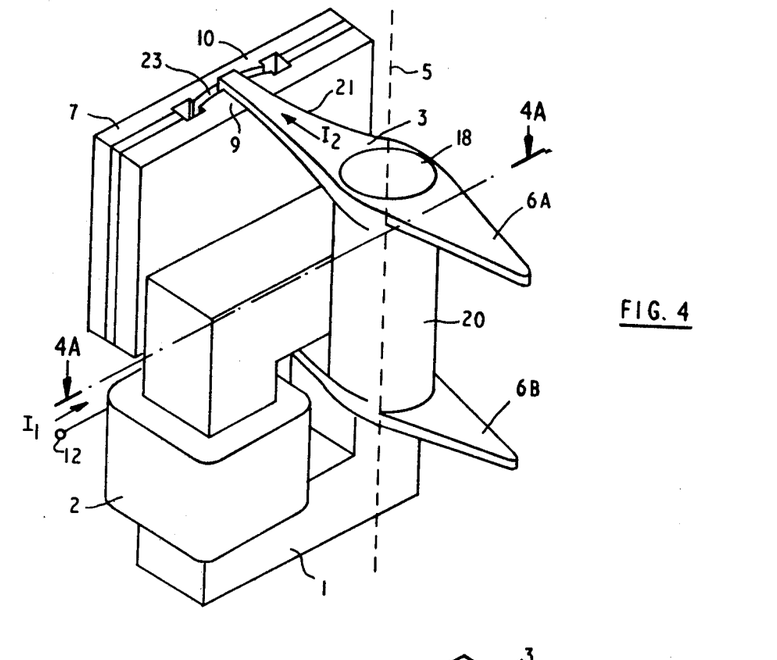
FIGS. 4 and 4A are isometric views of another electromagnetic actuator embodying the present invention.
Figure 4A:
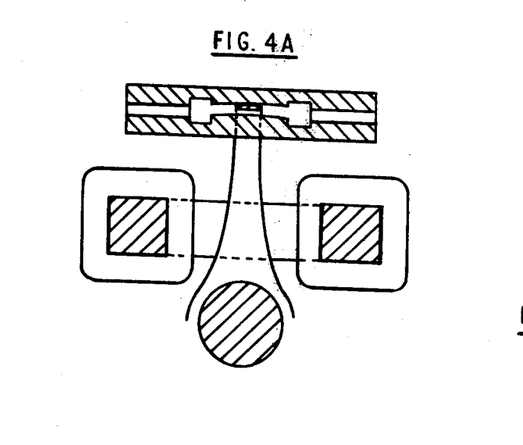
Figure 5:
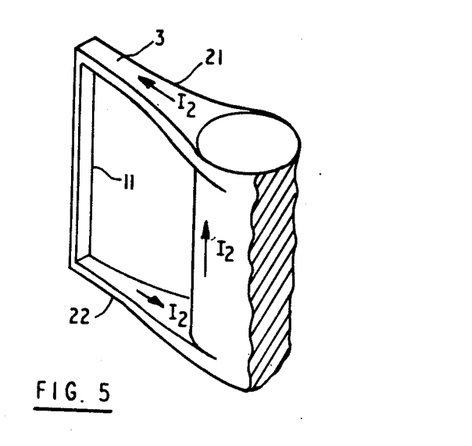
FIG. 5 shows the armature used in FIG. 4.

In FIG. 4, a square magnetic core 1 is coupled with armature 3 and carries a primary winding 2 which is split into two halves, on opposite limbs of magnetic core 1, but only one half is shown in the figure. Armature or secondary winding 3 is a casting mounted for angular movement about axis 5 on bearing 18, through a central cylindrical member 20 from which two tapered horizontal struts 21 and 22 extend. These struts are joined by vertical member 11 to form a single turn armature as shown in FIG. 5. Armature 3 is cast of copper or aluminium to provide a robust, low resistance structure. Cast integrally with armature 3 are horizontal transducer arms 6A and 6B. Only two arms are shown in FIG. 4, but in a particular disk file application additional horizontal arms may be provided.

A permanent magnet sandwich 7 with center legs 9 and 10 produces a radial magnetic field across arcuate air gap 23 along which vertical member 11 of armature 3 may move. Both the radial magnetic field and arcuate air gap 23 are centered on axis of rotation 5.

In FIG. 4 no supporting structure is shown for the sake of clarity. However the provision of a non-magnetic e.g. plastics material structure to rigidly locate armature 3 with respect to primary core 2 and magnetic sandwich 7 are within the abilities of a competent draftsman. Operation of the actuator illustrated in FIG. 4 is similar to that described in detail for FIG. 1 — A current $I_1$ applied to primary 2 induces a current $I_2$ in armature 3 which reacts with the static radial magnetic field in arcuate air gap 23 to cause angular movement of armature 3.

An advantage of the embodiments illustrated in FIGS. 3 and 4 is that the design of the armature is not constrained by the difficulty of manufacturing a winding on a former as in the prior art. The armature 3 can be cast in copper or aluminium, if desired integral with the transducer arms 6. Its shape may be optimized to minimize inertia and to minimize resistance. Thus armature 3 can be made mechanically stable and operated at a high temperature without fear of distortion. Reliability is improved as the only wound component, primary 2 is static and can be made robust without any inertia penalty.

The actuators described with reference to FIGS. 1, 3 and 4 cannot produce a continuous unidirectional force as this would require a sustained DC voltage across the primary winding 2. This voltage would cause a steadily increasing current in the primary winding which would eventually saturate magnetic core 1. Thus when the present actuator is used in a magnetic disc file some additional technique must be employed to supply a unidirectional force due to unbalance and windage. However this unidirectional force is very small compared to the dynamic force — typically less than 0.2%.

Belgian Pat. No. 841,412 (which became available as information to the public on Sept. 1, 1976) describes an actuator mechanism for a disk file consisting of a planar lamina triangular shaped substrate on which is formed a printed circuit conductive coil. The substrate is mounted for oscillatory motion about a pivot at the apex of the triangle and selected parts of the coil or substrate are positioned in the gaps of two C-shaped magnets. An arm carrying a record and playback head extends from the substrate on the opposite side of the pivot to the coil. In use, the actuator is mounted adjacent a rotatable record disk so that movement of the substrate about its pivot moves the head across tracks on the disk. The position of the head over a selected track during read or playback operations and movement of the head between tracks during access operations is controlled by supplying current of appropriate magnitude and polarity to the coil. This actuator mechanism may be used as an auxiliary actuator in conjunction with a main actuator shown in FIG. 4 to supply a continuous unidirectional force. This combination of a main actuator as shown in FIG. 4 and an auxiliary actuator as described in Belgian Pat. No. 841,412 is illustrated in FIG. 6.

Figure 6:
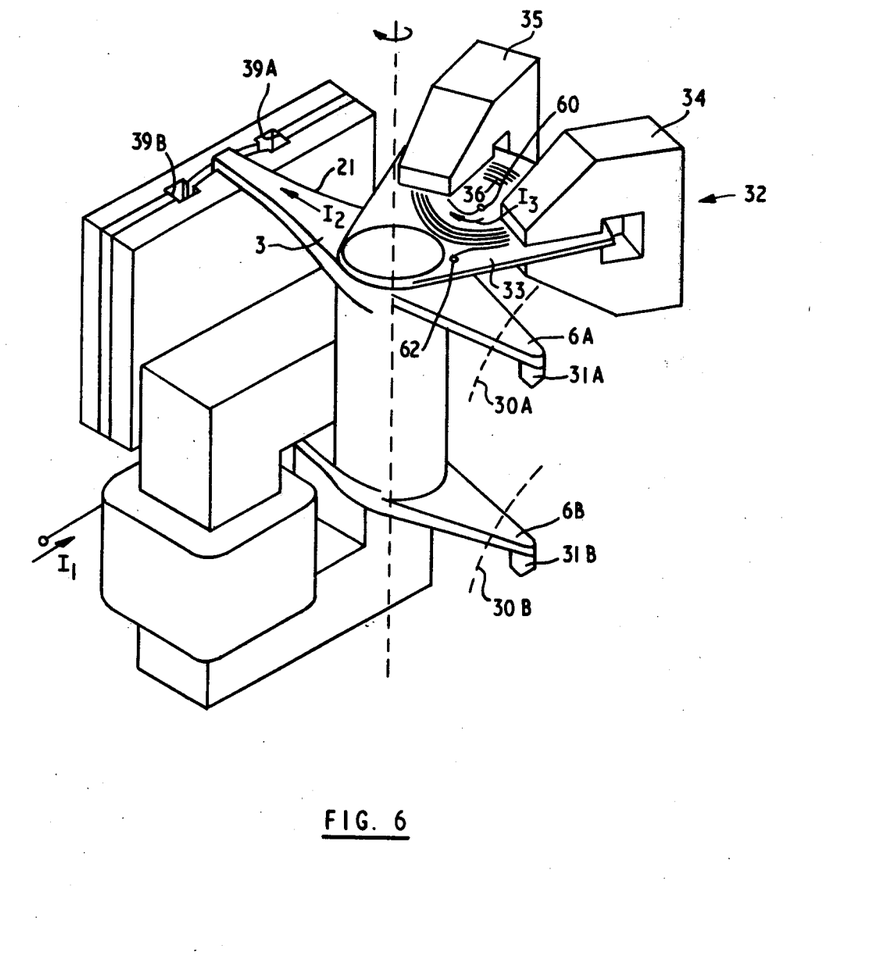
FIG. 6 shows the actuator of FIG. 4 with the addition of an auxiliary actuator for supplying continuous force in disc file apparatus.

FIG. 6 shows schematically two magnetic discs 30A and 30B which may be accessed by read/write transducers 31A, 31B carried by transducer arms 6A, 6B respectively. Such accessing of magnetic recording discs is well known in the art and will not be described here. The main electromagnetic actuator with armature 3 is essentially a pulse operated actuator capable of moving transducer arms 6A, 6B to a selected angular position. The auxiliary electromagnetic actuator 32 essentially operates in a steady mode to supply a substantially constant force to transducer arms to maintain the selected angular position.

Auxiliary actuator 32 consists of a printed circuit substrate 33 and two C shaped permanent magnets 34, 35 positioned to produce a magnetic flux perpendicular to substrate 33. Substrate 33 is attached to horizontal strut 21 and thus rotates with armature 3, and carries a printed circuit coil 36 on both sides. The coil on the underside is identical to the coil visible in the figure and the two are connected in series by a plated-through hole 60 at the inner extremeties of the coils. When a constant current $I_3$ is applied to printed circuit coil 36, a constant torque is applied to transducer arms 6A, 6B to balance the continuous forces experienced by these transducer arms during operation of the disc file. Reversal of the current produces motion in the opposite direction. Drive current to the coils is supplied to one of the terminals 62 and returned through the other via solder connected connecting wires (not shown).

Figure 7:
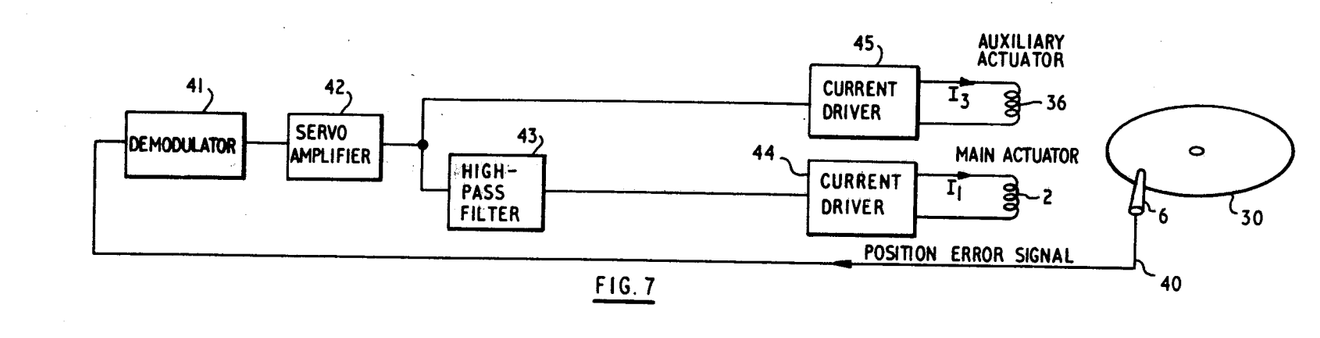
FIG. 7 is a circuit diagram illustrating track following for the actuator shown in FIG. 6.

Track following servo mechanisms for magnetic disc files using a conventional actuator are well known in the prior art and so will not be described here in detail. FIG. 7 shows the circuit diagram in block form of a track following servo mechanism for the actuator shown in FIG. 6. A position error signal is produced on line 40 by the transducer arm 6 located to access data tracks on magnetic disc 30. This error signal is fed back via demodulator 41 to servo amplifier 42. A high pass filter 43 rejects any low frequency or DC components of the output voltage from servo amplifier 43 and applies the resulting AC drive via a current driver 44 as current $I_1$ to the primary winding 2 of the main actuator.

Also, the voltage of servo amplifier 42 is applied via current driver 45 as current $I_3$ to coil 36 of auxiliary actuator 32. Thus whilst transducer arm 6 is in a track following mode the error signal will have DC and low frequency components which will be applied to the auxiliary actuator 32 which will supply the relatively low torque required. During track changing, the relatively high torque required for rapid movement will be supplied almost entirely by the main actuator which in this arrangement is not required to supply a continuous torque.

Figure 8:
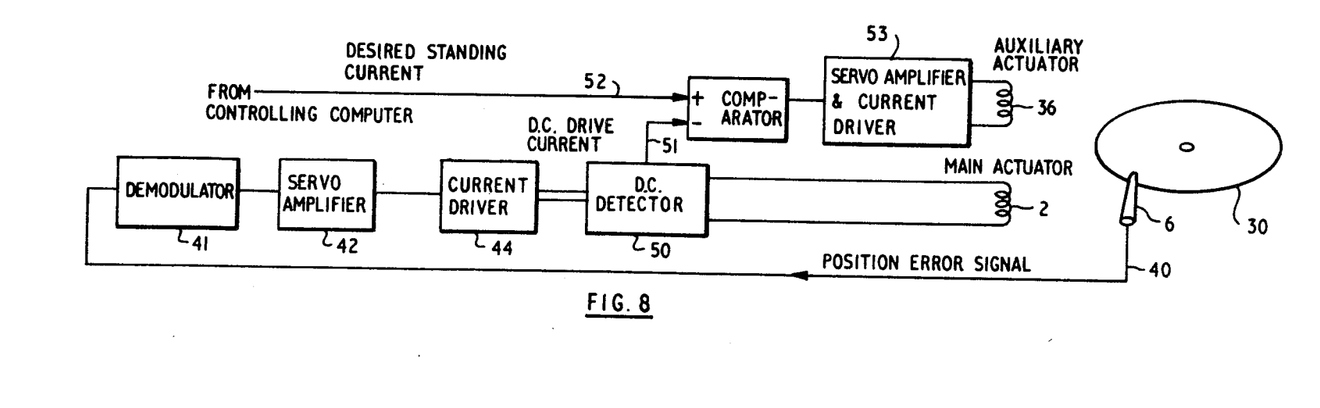
FIG. 8 is a circuit diagram illustrating alternative track following.

FIG. 8 illustrates an alternative track following technique. Transducer arm 6 produces a position error signal on line 40 which is fed via demodulator 41, servo amplifier 42 and current driver 44 to DC Detector 50. This detector passes the drive current from current driver 44 to the primary winding 2 of the main actuator and also generates a signal proportional to the DC component of the drive current on line 51. A controlling computer provides a signal proportional to the desired standing current on line 52 which is compared with the DC component on line 51 to produce a DC correction signal applied to coil 36 of the auxiliary actuator via servo amplifier and current driver 53.

The standing current is the DC current applied to the main actuator during track following and is selected by the controlling computer. The selection is such that when a track change is required adequate flux change is available without saturation occurring. Thus in the center track position the standing current required is zero, whereas at the outer and inner track positions the standing current will be a maximum (positive or negative) which will produce a flux close to saturation.

The DC correction signal will tend to move the actuator producing a change in the position error signal. The polarity of the connections is chosen so that this change in error signal will bring the current in the main actuator winding closer to the desired current. The effect of this arrangement will be that when a unidirectional torque is demanded of the actuator during track following, the torque will at first be supplied by the main actuator. In time, however, the steady torque will be supplied by the auxiliary actuator and not by the main actuator.

Figure 9:
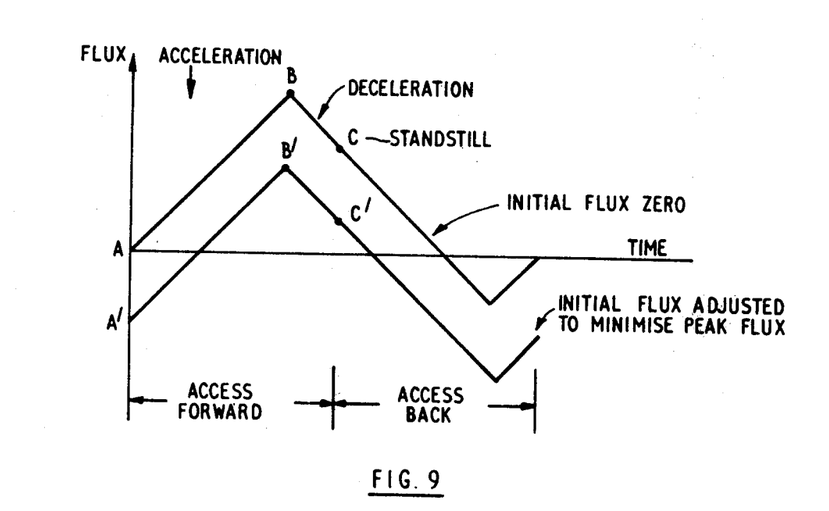
FIG. 9 is a graph illustrating the adjustment of initial flux to minimize peak flux.

The primary standing current may be controlled as already described at a level other than zero as illustrated in FIG. 9. If the standing primary current at the start of an access is arranged to be proportional to the angular distance of the actuator arm from the center of its travel, the absolute flux-carrying requirement of the induction circuit, and hence the mass of iron, is reduced. FIG. 9 is a plot of magnetic core 1 flux vs. time, for continuous accessing from one extreme to the other. While a drive voltage is applied, the flux grows linearly. Since the acceleration time is longer than the deceleration, there is a net change of flux over the access. If an access is now performed in the return direction, the flux will return to zero, having first passed through an opposite peak at the time of switching from acceleration to deceleration. It will be seen from FIG. 9 that the maximum flux can be reduced by starting the first access from A', that is with an initial standing current.

Saturation could be used to limit the velocity at which the actuator can hit an end stop such as 39A or 39B shown in FIG. 6, in the event of driver short-circuit failure. If there is just enough iron in the magnetic core to allow accessing over the full range at the maximum possible speed, without saturation, then at the instant the driver would have to switch from acceleration to deceleration in order to stop at the access limit, saturation will set in. The back-emf in the armature will establish a braking current, and the actuator will start to decelerate: not as rapidly as it would under driver deceleration, but still usefully.

For example: for the actuator shown in FIG. 3, the limiting velocity with which it is possible to hit the end stop after accelerating over the whole data range is 36.2rad/sec. Using saturation to limit this velocity, it is reduced to 25.2rad/sec with no performance penalty, and with a saving of iron of 25%. By accepting a small performance penalty on long accesses the failure limit velocity could be reduced still further.

I claim:
1. An electromagnetic actuator comprising:
    a transformer having a fixed primary winding magnetically coupled by a magnetic core to a secondary coil,
    means for pivotally mounting said coil,
    means to generate a static magnetic field coupled to said coil, said last mentioned means including a pole gap within which said coil may move, and
    an actuator arm fixedly attached to said coil and capable of pivotal movement whereby, when a current pulse is applied to said primary winding, a current is induced in said coil which reacts with the static magnetic field causing pivotal movement of said coil and attached arm.

2. An actuator as set forth in claim 1 in which the axis of rotation of said coil extends through an aperture in said magnetic core.

3. An actuator as set forth in claim 1 in which said means to generate a static magnetic field comprises a permanent magnet having an arcuate pole gap within said coil may move.

4. An actuator as set forth in claim 1 in which said magnetic core provides a closed magnetic path which is separate from said means to generate a static magnetic field.

5. An actuator as set forth in claim 1 in which said coil comprises a single turn formerless armature.

6. An actuator as set forth in claim 5 in which said armature is a cast structure of a low resistance metal.

7. An actuator as set forth in claim 5 in which said coil is of substantially rectangular shape.

8. An actuator as set forth in claim 1 in which said coil and said actuator arm lie substantially in the same plane.

9. An actuator as set forth in claim 1 in which said actuator arm carries a transducer for reading or writing on a record medium.

10. An actuator as set forth in claim 1 and including auxiliary means to provide a steady torque on said actuator arm.

11. An actuator as set forth in claim 10 in which said auxiliary means includes a coil through which a steady current may be passed.

12. An actuator as set forth in claim 11 further comprising means to supply a current to said primary winding to provide a relatively high initial torque and a current to said auxiliary means to provide a relatively low steady torque.

13. An actuator as set forth in claim 12 and including a transducer fixed on said actuator arm for traversing and having a magnetic transducing action with respect to a magnetic disk, said means to supply said currents to said primary winding and said auxiliary means being operative to supply such a current to said winding dependent upon the position of the transducer across the disk to allow adequate available flux change for track changing.

* * * * *

UNITED STATES PATENT AND TRADEMARK OFFICE
CERTIFICATE OF CORRECTION

PATENT NO. : 4,145,725
DATED : March 20, 1979
INVENTOR(S) : Christopher N. Wallis It is certified that error appears in the above-identified patent and that said Letters Patent are hereby corrected as shown below:

Column 7, line 6, after "within", insert --which--.

Signed and Sealed this

Twenty-sixth Day of June 1979

[SEAL]

Attest:

RUTH C. MASON
Attesting Officer

DONALD W. BANNER
Commissioner of Patents and Trademarks